F. L. WILLIS AND H. O. THOMAS.
TIRE RIM TOOL.
APPLICATION FILED JUNE 21, 1919.
1,349,541.
Patented Aug. 10, 1920.
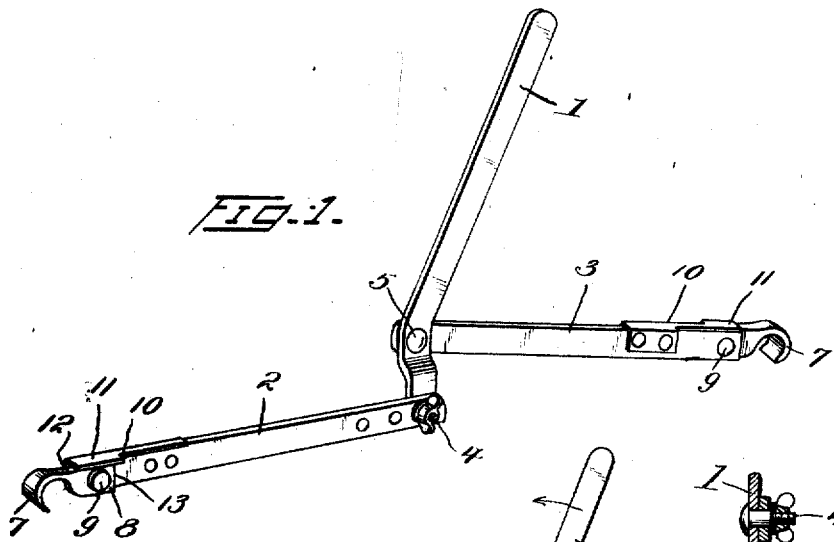
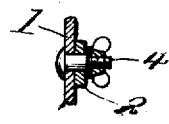
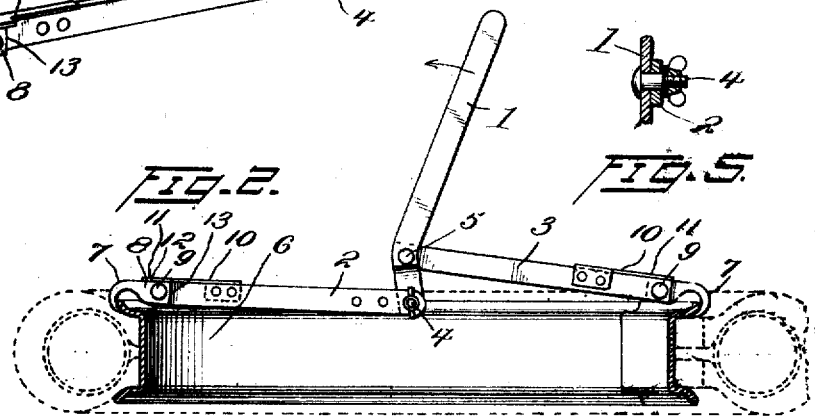
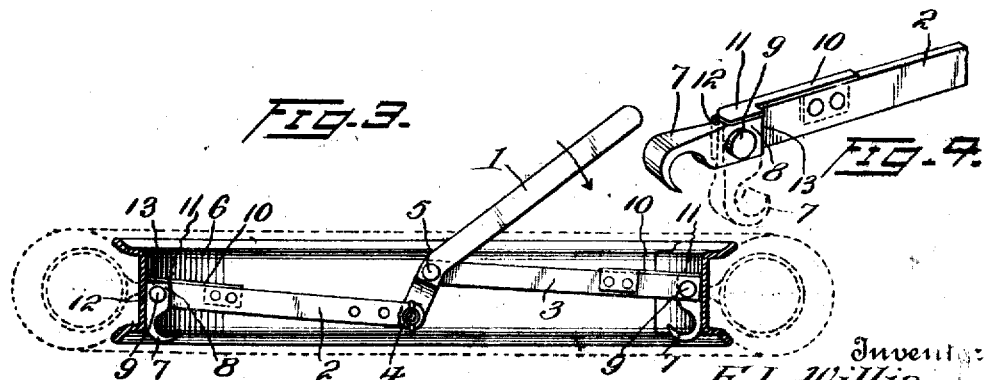
Inventors:
F. L. Willis
H. O. Thomas
By Victor J. Evans
Attorney

UNITED STATES PATENT OFFICE.

FRANK L. WILLIS AND HERBERT O. THOMAS, OF SANTA ROSA, CALIFORNIA.

TIRE-RIM TOOL.

1,349,541.　　　Specification of Letters Patent.　　Patented Aug. 10, 1920.

Application filed June 21, 1919. Serial No. 305,743.

*To all whom it may concern:*

Be it known that we, FRANK L. WILLIS and HERBERT O. THOMAS, citizens of the United States, residing at Santa Rosa, in the county of Sonoma and State of California, have invented new and useful Improvements in Tire-Rim Tools, of which the following is a specification.

This invention relates to tire rim tools or in other words tools for contracting and expanding the demountable tire carrying rims now in common use and adapted to have pneumatic tires mounted thereon, said rims being of what is known as the split or transversely divided type, and being capable of contraction and expansion in the operation of removing and replacing a tire thereon.

The main object of the present invention is to provide a tool which is adapted both for contracting and expanding such demountable rim with ease and expeditiously and with a minimum amount of physical effort on the part of the operator, also overcoming the liability of the rim tool slipping from the rim during the operation on the rim.

With the above and other objects in view the invention consists in the novel construction, combination and arrangement herein fully described and claimed.

In the accompanying drawings:

Figure 1 is a perspective view of the improved tool;

Fig. 2 is a diametrical section through a demountable rim showing the use of the tool during the rim contracting operation.

Fig. 3 is a view similar to Fig. 2 showing the rim expanding operation.

Fig. 4 is a fragmentary perspective view of the outer end portion of one of the tension and thrust members showing the two positions of the respective rim engaging hooks in full and dotted lines.

Fig. 5 is a detail section through the device illustrating the means for connecting the arms to the lever.

The tire rim tool comprises as the three main elements thereof, a lever 1 and a pair of tension and compression arms 2 and 3, the same being connected by horizontal pivots 4 and 5 to the lever 1. The pivots 4 and 5 are in the form of bolts provided with suitable shoulders and nuts as shown, so as to afford a pivotal movement between the members 2 and 3 on the one part and the lever 1 on the other part so that said parts of the tool will work easily and without binding.

The pivots 4 and 5 are arranged in spaced relation to each other on the lever 1 as shown and that portion of the lever which is located between said pivots 4 and 5 is laterally offset as shown to provide ample clearance for the relative movement of the three main portions or members of the device during the contracting and expanding operation on the tire carrying rim which is indicated at 6, said rim being of the split type to enable it to be contracted and expanded in the operation of removing a tire and replacing the same in a manner well understood to those familiar with the art to which this invention appertains.

The main feature of the present invention resides in the hooks at the outer ends of the tension and compression arms 2 and 3, said hooks are represented at 7, each embodying a bill and a substantially square or rectangular shank 8 through which passes a horizontal pivot 9 by means of which the hook is horizontally pivoted to the outer extremity of the respective compression and tension members. Secured fixedly to the outer end portion of each of the compression and tension arms, is a flat leaf spring 10 which extends along the top edge of the respective tension and compression members and has a laterally spread free end portion 11 which is designed to bear against either of two flat surfaces or edges 12 and 13 of the tang or shank of the adjacent hook. By means of the construction just described, the hook may be held by the respective spring in an extended or rim gripping position or it may be held by the same spring in a folded position when swung inwardly within the outer extremity of the respective arm as illustrated in Fig. 4, the last named figure showing the two positions of the hook in full and dotted lines.

When the bills of the hooks are moved downwardly below the arms, the upper longitudinal edges of the shanks are disposed flush with the outer ends of the arms so as to coöperate with the same in forming wide contact surfaces adapted for engaging the inner sides of the rim when the device is employed for spreading the rim.

In order to contract a wheel rim, the hooks are swung outwardly to the position illustrated in Fig. 2 and after engaging the same over the edges of the rim, the lever 1 is used to move the compression and tension arms toward each other thereby contracting the rim so that the tire may be moved therefrom. In order to expand the rim, the hooks at the outer extremities of the compression and tension arms are swung inwardly as shown in Fig. 3 and the extreme ends of said arms 2 and 3 are brought to bear against the inner face of the rim as shown in Fig. 3. As clearly illustrated in Fig. 3, the shanks of the hooks have their upper longitudinal edges positioned flush with the forward ends of the arms 2 and 3 when the bills of the hooks are extended downwardly out of the way. By this construction a wide contact surface is presented to each side of the rim so that the possibility of the device slipping and injuring the operator is eliminated. The lever 1 is fulcrumed to force the arms 2 and 3 apart thereby spreading the rim to its full diameter, this being done without endangering the hooks which are folded at the time out of the way. The tool is compact and may be stored within a compartment of the automobile or motor truck. By providing one of the arms 2 and 3 with a longitudinal series of holes to receive the pivot which attaches it to the lever 1, the tool as a whole may be adapted to wheel rims of different diameters.

What is claimed is:

1. A rim spreading and contracting device including a pair of arms, means for moving the arms longitudinally, hooks having rectangular shanks horizontally pivoted to the outer portions of said arms at the sides of the same, and having bills adapted to be swung downwardly for positioning the upper longitudinal edges of said shanks flush with the forward ends of the arms for forming wide rim contact surfaces, and means for securing the hooks in adjusted positions.

2. A rim spreading and contracting device including a pair of arms, means for moving the arms longitudinally, hooks having rectangular shanks horizontally pivoted to the arms at the outer portions of the same, and provided with bills adapted to be swung downwardly for positioning the upper longitudinal edges of said shanks flush with the outer terminals of the arms for forming wide rim contact surfaces, and flat leaf springs secured to the upper longitudinal edges of said arms and having their forward portions enlarged laterally for engaging the shanks of said hooks whereby the same are secured in position.

In testimony whereof we affix our signatures.

FRANK L. WILLIS.
HERBERT O. THOMAS.